(12) United States Patent
Asplund et al.

(10) Patent No.: US 6,519,169 B1
(45) Date of Patent: Feb. 11, 2003

(54) MULTIPHASE INVERTER WITH SERIES OF CONNECTED PHASE LEGS

(75) Inventors: Gunnar Asplund, Ludvika (SE); Bo Bijlenga, Åmål (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/936,988

(22) PCT Filed: Mar. 29, 1999

(86) PCT No.: PCT/SE00/00606
§ 371 (c)(1),
(2), (4) Date: Dec. 3, 2001

(87) PCT Pub. No.: WO00/62409
PCT Pub. Date: Oct. 19, 2000

(30) Foreign Application Priority Data

Mar. 29, 1999 (SE) .............................................. 99011272

(51) Int. Cl.$^7$ .......................................... H02M 7/5387
(52) U.S. Cl. ....................................... 363/132; 363/137
(58) Field of Search .................................. 363/132, 137

(56) References Cited

U.S. PATENT DOCUMENTS

| | | | |
|---|---|---|---|
| 3,932,799 A | * | 1/1976 | Frank et al. ................. 363/137 |
| 4,727,303 A | | 2/1988 | Morse et al. ................. 318/616 |
| 5,889,668 A | * | 3/1999 | Schavder et al. ............ 363/137 |

FOREIGN PATENT DOCUMENTS

| | | | |
|---|---|---|---|
| EP | 0159131 | 12/1988 | ........... G05B/19/42 |
| EP | 0498891 | 8/1992 | .......... G05D/13/62 |
| EP | 0850730 | 7/1998 | ............. B25J/9/22 |
| EP | 0867998 A1 | 9/1998 | ............ H02H/7/12 |
| EP | 0868013 A1 | 9/1998 | ............ H02M/1/00 |
| WO | WO 92/03769 | 3/1992 | ........... G05B/19/40 |
| WO | WO 98/53376 | 11/1998 | ......... G05B/19/423 |

* cited by examiner

*Primary Examiner*—Jeffrey Sterrett
(74) *Attorney, Agent, or Firm*—Dykema Gossett, PLLC

(57) ABSTRACT

A VSC-converter for converting direct voltage into alternating voltage and conversely has at least two phase legs (1–3) with each at least two current valves (4–9) connected in series, the valves consisting of at least a semiconductor element (10) of turn-off type and a rectifying member (11) connected in anti-parallel therewith. A midpoint (12) of the phase leg between said valves is adapted to form a phase output and be connected to a phase (29) of an alternating voltage network. The phase legs (1–3) of the converter are connected in series, and opposite ends of the series connection formed by an outer end of a respective outer phase leg (1–3) in the series connection are intended to be connected to a pole conductor (19, 20) each of a direct voltage network.

22 Claims, 9 Drawing Sheets

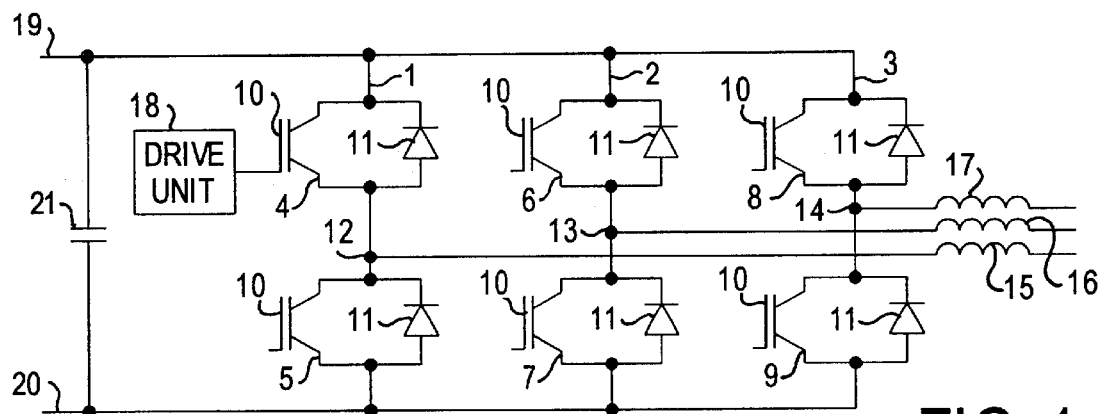
FIG. 1
(PRIOR ART)
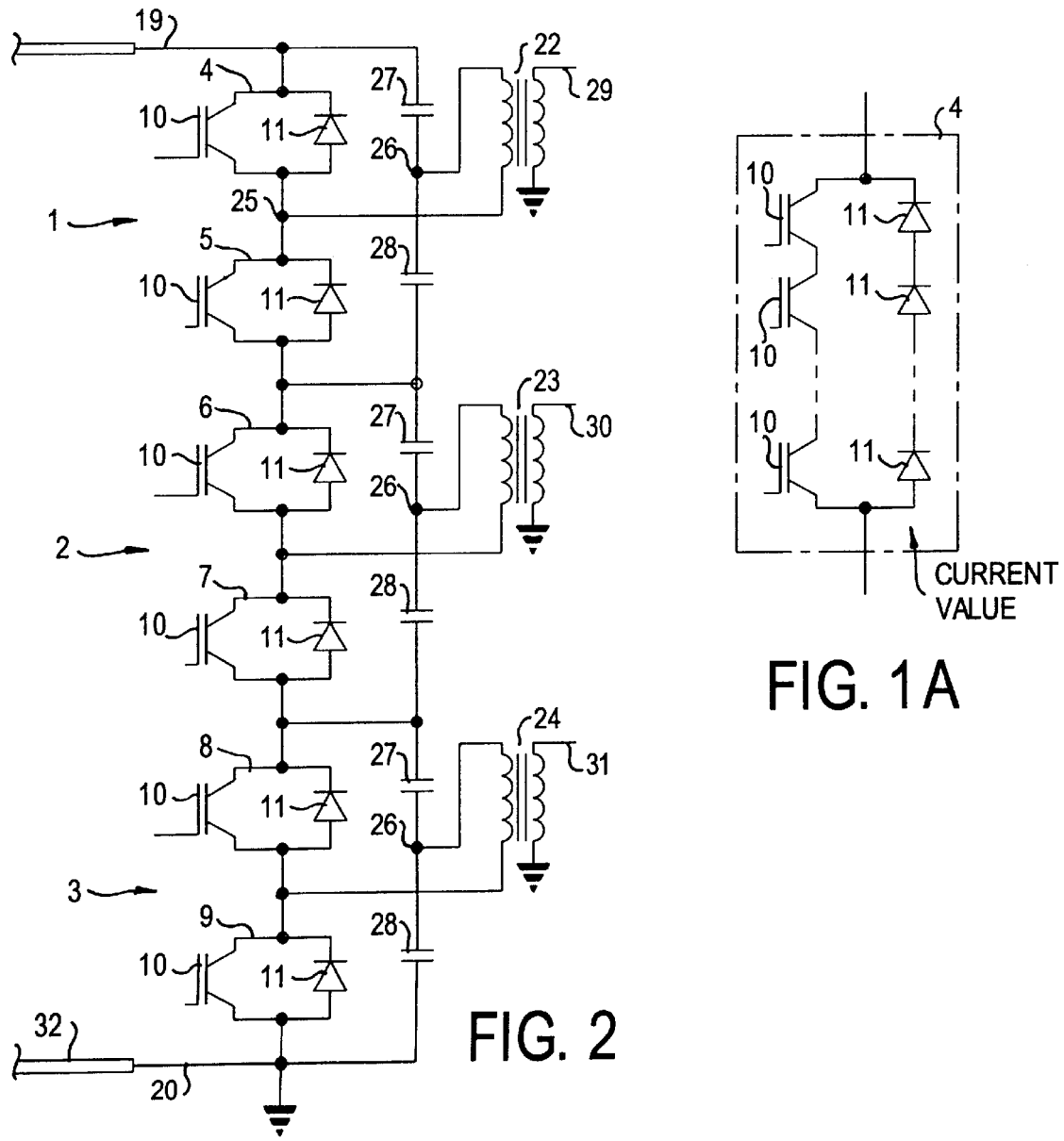
FIG. 1A
FIG. 2

MULTIPHASE INVERTER WITH SERIES OF CONNECTED PHASE LEGS

FIELD OF THE INVENTION AND PRIOR ART

The present invention relates to a VSC-converter for converting direct voltage into alternating voltage and conversely and which has at least two phase legs having each at least two current valves connected in series, said valves consisting of at least a semiconductor element of turn-off type and a rectifying member connected in anti-parallel therewith, a mid point of the phase leg between said valves being adapted to form a phase output and to be connected to a phase of an alternating voltage network Such a VSC-converter for connection between a direct voltage network and an alternating voltage network is already known through for example the thesis "PWM and control of two and three level High Power Voltage Source Converters" by Anders Lindberg, Royal Institute of Technology, Stockholm, 1995 in which publication a plant for transmitting electric power through a direct voltage network for high voltage direct current (HVDC) while utilizing such a converter is described. Before the creation of this thesis plants for transmitting electric power between a direct voltage network and an alternating voltage network have been based upon the use of network commutated CSC(Current Source Converter)-converters in stations for power transmission. However, in this thesis a totally new concept is described, which is based on instead using VSC(Voltage Source Converter)-converters for forced commutation for transmitting electric power between a direct voltage network being voltage stiff therethrough, in the case in question for high voltage direct current, and alternating voltage networks connected thereto, which offers several considerable advantages with respect to the use of network commutated CSC-converters in HVDC, among which it may be mentioned that the consumption of active and reactive power may be controlled independently of each other and there is no risk for commutation faults in the converter and thereby no risk for transmitting commutation faults between different HVDC-links, which may take place for network commutated CSC-s. Furthermore, there is a possibility to feed a weak alternating voltage network or a network without any generation of its own (a dead alternating voltage network). There are also further advantages.

The invention is not restricted to this application, but the converter may just as well be intended for conversion in an SVC in which the direct voltage network is then replaced by a DC-intermediate link. "Network" is also to be given a very broad sense, and it has not to be a question about any such networks in the normal meaning of this word. The voltages of the direct voltage side of the converter are advantageously high, 10–400 kV, preferably 50–400 kV.

When transmitting direct voltage on a direct voltage network connected to the converter it is desired to have a voltage being as high as possible, since the transmission losses are reduced when the voltage increases. However, an increase of this voltage means that the number of semiconductor elements of turnoff type connected in series in the current valves of the converter has to be higher so as to together be able to take the voltage required, which is distributed among them. This means that the cost for the high number of semiconductor elements of turn-off type and rectifying members (rectifying diodes) will be high. This cost is particularly unfavourable when transmitting low powers on the direct voltage network, since the fact that the power is proportional to the voltage will mean a much lower voltage across the converter than the voltage it is dimensioned for, so that this and also the conductor of the direct voltage network, which is designed for higher voltages, are poorly utilized. Thus, the cost per volt becomes in such a case very high.

SUMMARY OF THE INVENTION

The object of the present invention is to provide a VSC-converter of the type defined in the introduction, which is more cost efficient than the converters already known with respect to the ability to generate certain voltage levels on the direct voltage side of the converter.

This object is according to the invention obtained by connecting the phase legs of such a converter in series, and the opposite ends of the series connection formed by an outer end of the respective outer phase leg in the series connection are intended to be connected to a pole conductor each of a direct voltage network.

By connecting the phase legs of the converter in series in this way between the two pole conductors of the direct voltage network each current valve will at a determined voltage of the direct voltage side have a lower voltage to hold in the blocking state thereof than in VSC-converters already known, where the different phase legs are connected in parallel between the two pole conductors of the direct voltage side, so that a lower number of semiconductor elements of turn-off type and rectifying members connected in series or such ones dimensioned for lower voltages and thereby being less expensive may be used in each current valve for obtaining the voltage in question. Another way to express this is to say that for a given set of semiconductor elements of turn-off type and rectifying members of the converter and thereby a given cost thereof a higher voltage may be obtained on the direct voltage side than for a VSC-converter already known through the design of the converter according to the invention, so that the cost per volt may be reduced. More exactly, a cost so defined per volt will be at the most ½ (in the case of a converter having only two-phase legs) of the cost of a converter of this type already known. However, in the practice three phases are mostly used which then means a reduction of the cost per volt with respect to semiconductor elements of turn-off type and rectifying members to a third, and it is also especially advantageous to connect exactly three phase legs in series in this way, since the mutual phase displacement of 120° of the voltage therebetween results in a uniform power flow through the converter at the series connection of the phase legs.

According to a preferred embodiment of the invention a transformer is connected to each phase output between this and the alternating voltage network phase belonging thereto. A transformer normally already there for adaption of the voltage between the alternating voltage network and the direct voltage network may in this way be utilized for realizing said series connection. One winding of the respective transformer is then preferably connected through a first end to the phase output of the phase leg and through a second end in that way to the current valve that a closed loop through the current valve is formed.

According to another preferred embodiment of the invention one winding of the respective transformer is connected through a first end to the phase output of the phase leg and through a second end to a midpoint between two capacitors connected in series in parallel with the current valves of the phase leg. The invention may in this way easily be realized, in which each phase leg then preferably has two current valves connected in series, as in a conventional 2-pulse bridge. The return current to the alternating voltage network will in this case go through the two capacitors.

According to another preferred embodiment of the invention each phase leg has a NPC-connection, i.e. four current valves connected in series, in which one point of the phase leg between the two inner valves of the series connection forms said phase output, and a series connection of two so called clamping rectifying members directed in the same direction with respect to said series connection as said rectifying members is connected between on one hand a point between one outer valve in the series connection and the inner valve next thereto and on the other a point between the other outer valve of the series connection and the inner valve next thereto with a midpoint between the two clamping rectifying members connected to a zero potential defined by capacitors connected in series with the phase leg. The advantage by using a so called NPC-(Neutral Point Clamped)-connection with respect to a so called 2-pulse bridge is that a lower switching frequency may be used, which means lower losses and a higher efficiency. The number of semiconductor elements of turn-off type and rectifying members connected in series in each phase leg will for the rest be just as high as in the case of 2-pulse bridges connected in series, but each phase leg has four current valves connected in series, besides the addition of the clamping diodes.

According to another preferred embodiment of the invention the clamping rectifying members are formed by a rectifying diode and a semiconductor element of turn-off type connected in anti-parallel therewith. Such a connection of a so called NPC-converter is described in the Swedish patent application No. 9800205-8 of the applicant and the advantages thereof are thoroughly penetrated therein and involves primarily a saving of the number of semiconductor elements of the converter, since not all of them have to be controlled with high frequencies and thanks to this high voltage semiconductor elements not able to take such high frequencies without unacceptably high switching losses may be used for certain semiconductor elements, so that a considerable saving of costs and simplifying of the control of the converter may be achieved.

According to another preferred embodiment of the invention said members taking a voltage are formed by a flying capacitor connected between said points. By using flying capacitors the advantages present in a so called NPC-connection may be obtained without using any further semiconductor elements (clamping rectifying members). An advantage of the use of so called flying capacitors for obtaining additional voltage levels for the phase output besides the voltage level of the two ends of the phase leg with respect to a use of so called clamping diodes is primarily that the semiconductor elements in the latter case have to be controlled in such a way that a non-uniform distribution of switching losses among them takes place, so that in the practice all semiconductor elements have to be dimensioned for managing the maximum load to which an individual semiconductor element may be subjected, since otherwise particular considerations have to be taken to the design of each individual semiconductor element when controlling them. This makes the total cost for the semiconductor elements comparatively high, since some of them in most operation situations will be over-dimensioned. By using flying capacitors instead, such as in the device defined in the introduction, a multi level converter with a possibility to a more uniform load on the semiconductor elements with respect to switching losses may be obtained without using expensive so called clamping diodes or additional semiconductor elements.

According to another preferred embodiment of the invention each phase leg is formed by series connections of each two current valves, said series connections being connected in parallel, i.e. a so called H-bridge. An advantage of really replacing a phase leg by two phase legs or a H-bridge in such a way is that the ability to withstand current of the converter is in principle doubled, so that it is possible to take out twice as much current from the converter and thereby a higher power may be transmitted. Preferably, a winding of the transformer is for each phase leg connected to the converter with a first end connected to a midpoint between the two current valves of one series connection of current valves and the other end connected to the midpoint between the two current valves of the other series connection of current valves. An additional advantage of this converter configuration is that the voltage over the transformer winding now may assume three levels, for what reason the control of the semiconductor elements does not have to take place with the same high frequency, so that the switching losses may be kept down, which enables a higher efficiency and/or possibility to obtain an even higher power.

According to another preferred embodiment of the invention one of said pole conductors is intended to be on high voltage potential, while the other pole conductor is adapted to be on a potential close to earth for so called monopolar operation of the direct voltage network. The possible voltage for a given number of components of the current valves may hereby be increased even more, namely be doubled with respect to the case of bipolar operation with two pole conductors having a potential of the same amount but opposite signs. This means that a low voltage, low cost cable may be used as one of the pole conductors for the return current close to earth potential, but return through earth or water is also conceivable.

According to another preferred embodiment of the invention the two pole conductors are intended to be on high voltage potential of the same amount but opposite sides for so called bipolar operation. The advantage of such an arrangement is that in the case that a bipolar transmission is desired the valve functions will be fewer, the capacitors will be fewer and the transformer windings will be fewer in this way.

According to another preferred embodiment of the invention at least one inductor and a highpass filter are arranged between the respective current valve and the windings of the transformer for reducing harmonics out towards the alternating voltage network and reducing stresses on the transformer. The transformer windings will mainly thanks to this see a sinusoidal voltage between the outputs thereof with a superposed direct voltage to earth, which gives a robust solution and a less costly transformer.

According to another preferred embodiment of the invention said semiconductor elements of turn-off type are constituted by bipolar transistors with an insulated gate (IGBT= Insulated Gate Bipolar Transistor). It is particularly advantageous to use IGBT's as semiconductor elements of turn-off type in this context, since they may easily be controlled simultaneously, so that they will behave as one single semiconductor element of turn-off type or breaker.

Further advantages as well as advantageous features of the invention appear from the following description and the other dependent claims.

BRIEF DESCRIPTION OF THE DRAWINGS

With reference to the appended drawings, below follows a specific description of preferred embodiments of the invention cited as examples.

In the drawings:

FIG. 1 is a schematic circuit diagram illustrating the construction of a VSC-converter already known in the form of a so called 6-pulse bridge, FIG. 1A illustrates a current valve, FIG. 2 is a view corresponding to FIG. 1 of a VSC-converter according to a first preferred embodiment of the invention.

DETAILED DESCRIPTION OF PREFERRED EMBODIMENTS OF THE INVENTION

Figure 3:
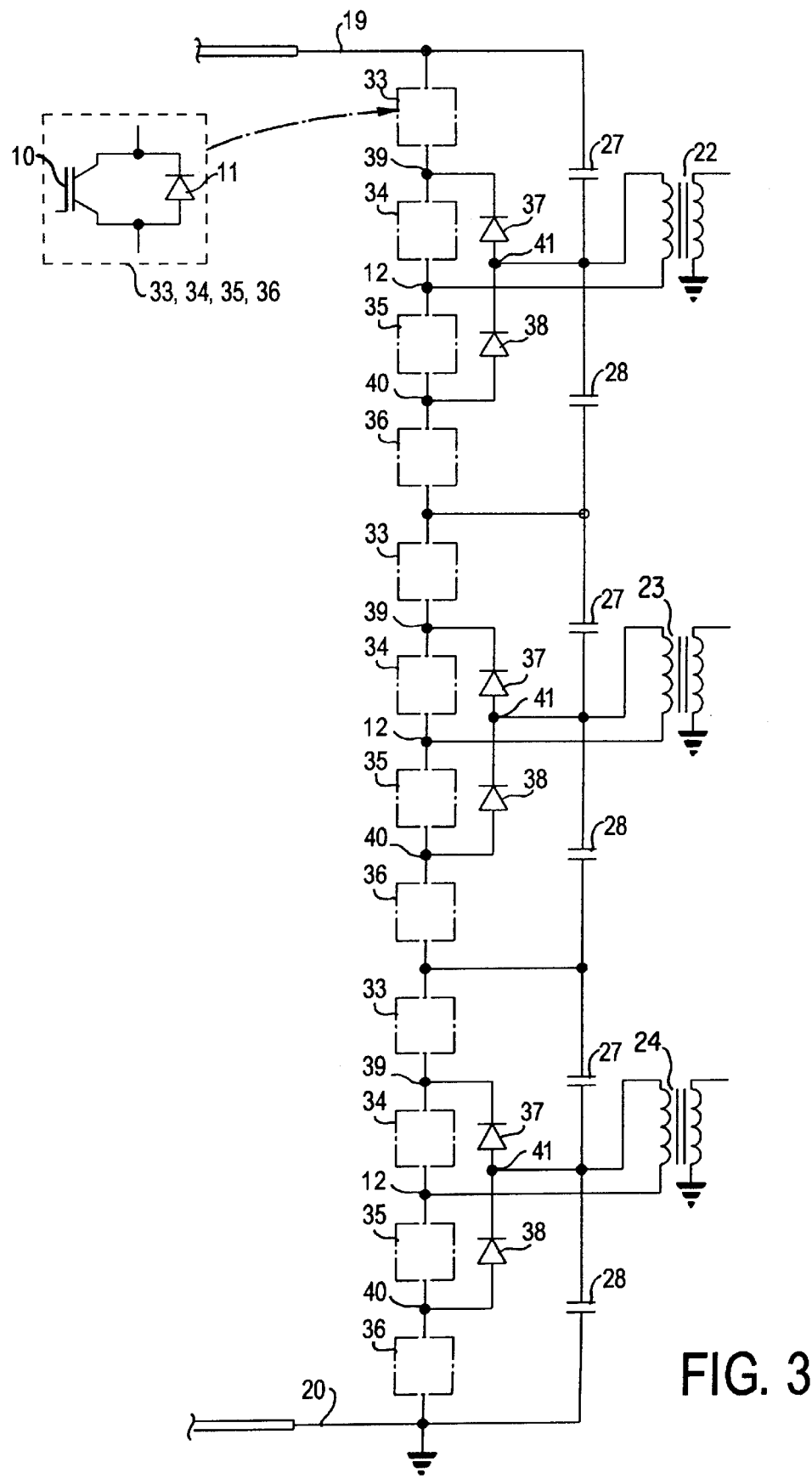
FIG. 3 is a view corresponding to FIG. 2 of a VSC-converter according to a second preferred embodiment of the invention.

A VSC-converter already known is schematically shown in FIG. 1 and has a so called 6-pulse bridge, which has three phase legs 1–3 with two current valves 4–9 connected in series each, each current valve being made of a plurality of semiconductor elements 10 of turn-off type connected in series and a plurality of rectifying members in the form of so called free-wheeling diodes 11 connected in series and connected in anti-parallel with the semiconductor elements. The series connection of semiconductor elements and diodes, respectively, is in the Figure summarized by one single symbol therefore, although they in the practice have to be there in a comparatively high number so as to be able to hold the high voltage, well in the order of several 100 kV, which has to be held by them jointly in the blocking state of the valve. A midpoint of the respective phase leg between said valves is adapted to form a phase output 12–14 and through a phase reactor 15–17 be connected to the phase of an alternating voltage network. All power semiconductor elements in one valve are intended to be turned on simultaneously, and they are preferably IGBT's, since such elements may be turned on and turned off simultaneously in a reliable way, through signals from a drive unit 18 each schematically indicated for the valve 4, so that the semiconductor elements in the first valve 4 conduct when a positive potential is desired in the phase output 12 and the semiconductor elements in the other current valve 5 of the phase leg conduct when a negative potential is desired on the phase output 12. By controlling the power semiconductor elements according to a determined pulse width modulation pattern (PWM) the direct voltage across a capacitor 21 connected between the two pole conductors 19, 20 on the direct voltage side of the converter may be used for generating a voltage on the phase output 12, the fundamental tone component of the which is an alternating voltage with a desired amplitude, frequency and phase position. If for example a voltage of 100 kV between the two pole conductors 19, 20 of the direct voltage network is desired, the semiconductor elements and the free wheeling diodes, respectively, of each current valve together have to be able to hold this voltage without failing, so that for example in the case that each semiconductor element can hold 5 kV at least fourty (only half of the voltage may be utilized) such ones are required per valve. If, however, sometimes low powers have to be transmitted on the direct voltage network, the valves will then be overdimensioned, i.e. the voltage handling capability thereof is not utilized, since the voltage sinks with the power to be transmitted.

A VSC-converter according to a first preferred embodiment of the invention is schematically illustrated in FIG. 2, and parts having correspondence in FIG. 1 have in this figure been provided with the same reference signs. This converter differs from the one already known according to FIG. 1 by the fact that the three phase legs 1, 2, 3 are connected in series, and a transformer 22–24 is connected to each phase output with one winding thereof connected through a first end 25 to the phase output of the phase leg and through a second end 26 to a midpoint between two capacitors 27, 28 connected in series and in parallel with the current valves of the phase leg. The other winding of the transformer 22–24 is connected to one phase 29–31 of a three-phase alternating voltage network. The alternating voltage return current will during the conversion flow through the respective capacitor 27, 28, so that this has to be dimensioned larger than the capacitor 21. By connecting a transformer in this way to each phase leg a connection in series of the three phase legs is accordingly made possible. This means that for the same number of components, i.e. semiconductor elements of turn-off type and free-wheeling diodes, per current valve a three times as high voltage may be handled and thereby a three times as high voltage may be obtained on the direct voltage side. As an alternative a third as many components may be used for managing a certain voltage. This means for example in the case discussed above that 14 instead of 40 semiconductor elements of turn-off type are required per current valve for jointly being able to hold 100 kV. Moreover, in the case illustrated in FIG. 2 one pole conductor 20 of the direct voltage side is connected to earth, while the other 19 is connected to high voltage, so that so called monopolar operation is obtained and a low voltage, low cost cable 32 may be used for the return current. A utilizing of monopolar operation means an additional multiplication of the voltage of the high voltage pole conductor 19 with respect to earth by a factor 2 with respect to bipolar operation.

A VSC-converter according to a second preferred embodiment of the invention is schematically illustrated in FIG. 3 and this differs from the one according to FIG. 2 by the fact that each phase leg has here a NPC-connection, i.e. four current valves 33–36 connected in series, in which a point of the phase leg between the two inner valves 34, 35 of the series connection forms the phase output 12, and a series connection of two so called clamping diodes 37, 38 directed in the same direction with respect to a series connection of the rectifying members 11 is connected between on one hand a point 39 between one outer valve of the series connection and the next inner valve and on the other a point 40 between the other outer valve of the series connection and the next inner valve. A midpoint 41 between the two clamping diodes is connected to a zero potential defined by capacitors 27, 28 connected in series and connected in parallel with the phase leg. A transformer 22–24 is connected in the same way to the respective phase leg as for the embodiment according to FIG. 2. How an NPC-valve, i.e. a three level valve, of this type is controlled is generally known among men with skill in the art in this field. An advantage of this embodiment with respect to the one according to FIG. 2 is that a control of the semiconductor elements in a NPC-connection does not have to take place with a frequency being just as high as for an ordinary 2-pulse bridge according to FIG. 2, for which reason the switching losses may be kept down.

Figure 4:
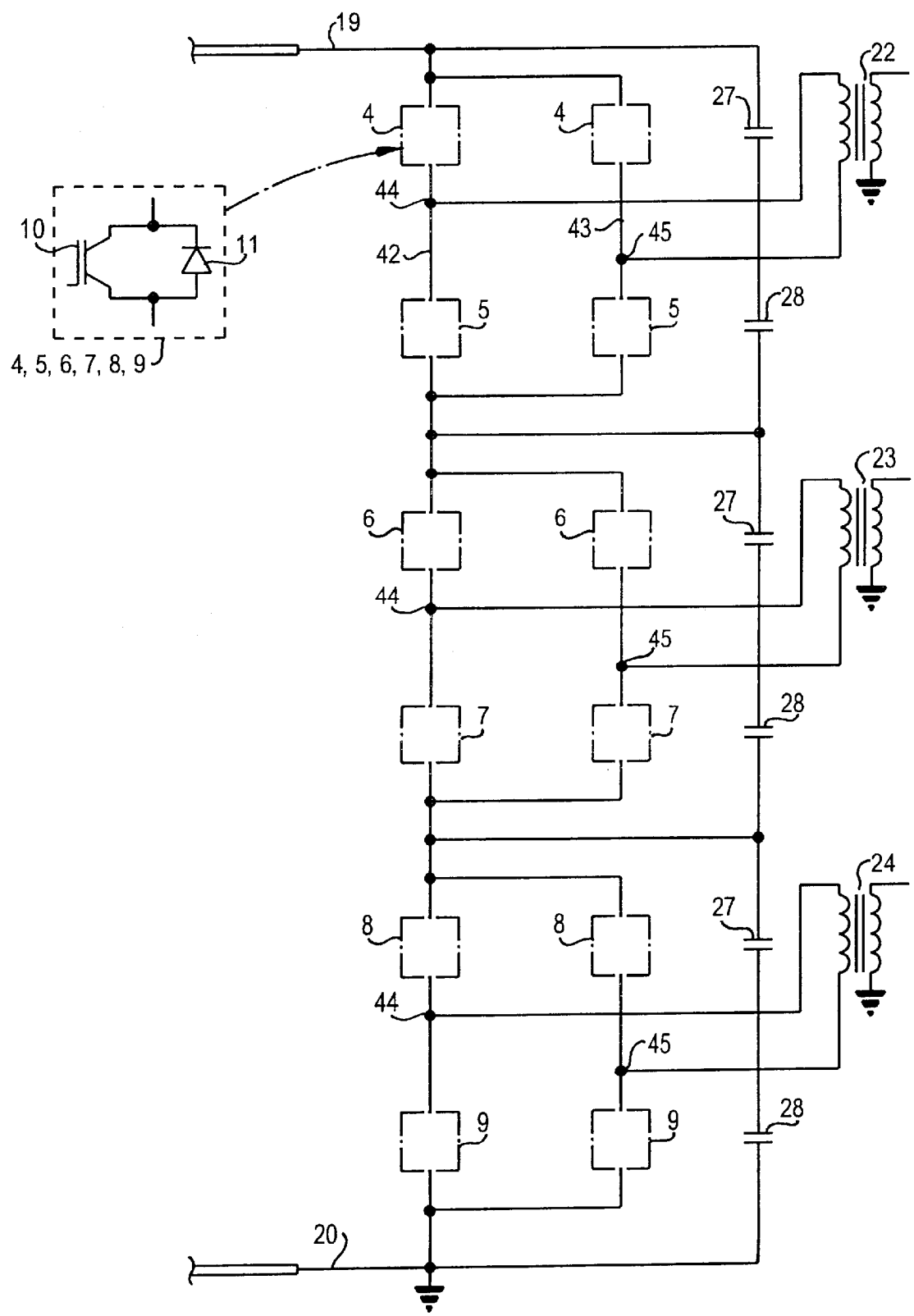
FIG. 4 is a view corresponding to FIG. 2 of a VSC-converter according to a third preferred embodiment of the invention.

A VSC-converter according to a third preferred embodiment of the invention is illustrated in FIG. 4 and it differs from the one according to FIG. 2 primarily by the fact that each phase leg is formed by a parallel connection in H-bridge 42, 43, which each consists of a series connection of two current valves. Furthermore, a winding of the transformer 22 in question is here connected to the converter through the first end connected to a midpoint 44 between the two current valves of one series connection of current valves and through the other end connected to a midpoint 45 of the other series connection of current valves. An advantage of this embodiment with respect to the one according to FIG. 2 is that the current handling ability is here doubled, so that higher powers may be transmitted and at a given transmitted power the losses may be reduced. However, more components, i.e. semiconductor elements and free-wheeling diodes, than in the embodiment according to FIG. 2 are here required.

Figure 5:
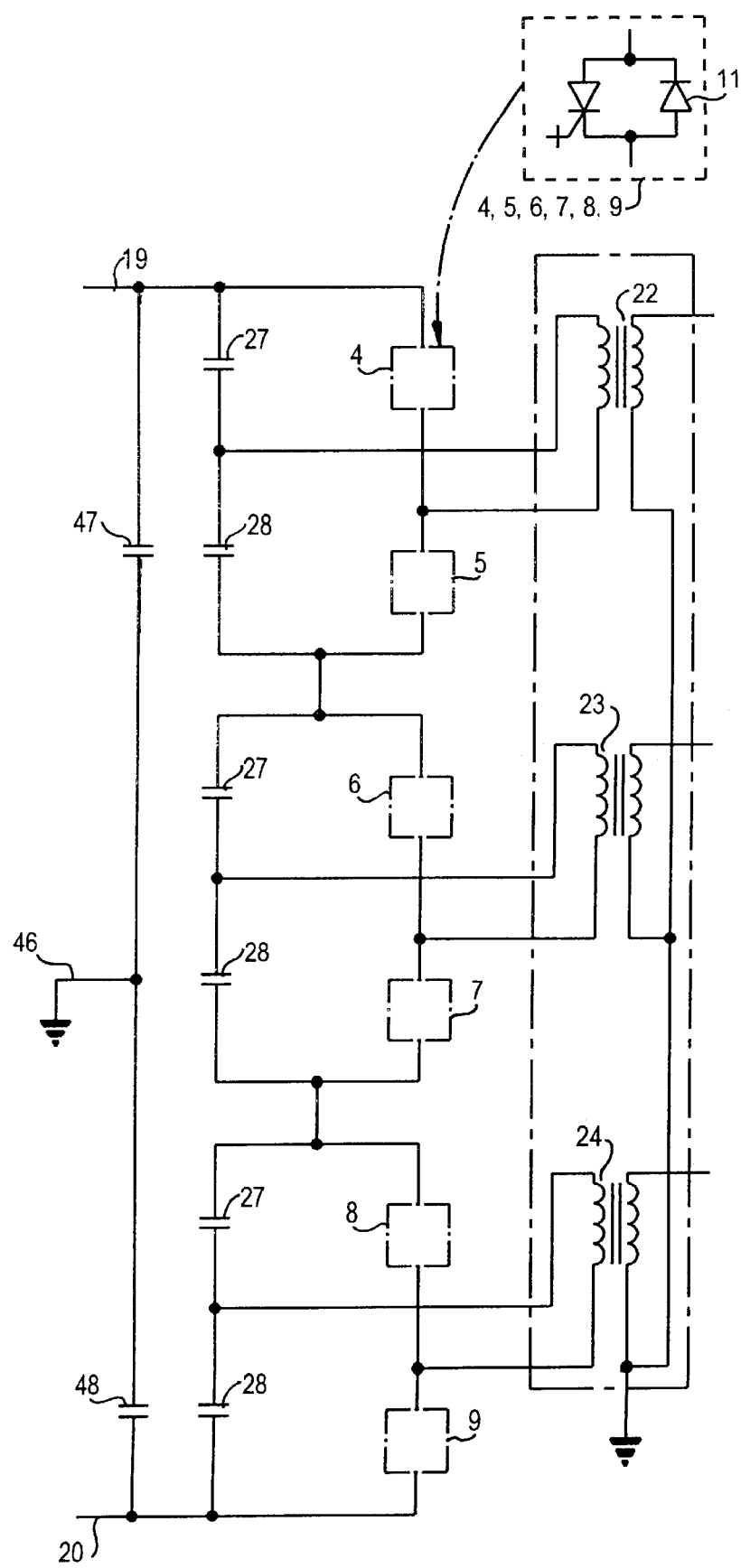
FIG. 5 is a view corresponding to FIG. 2 of a VSC-converter according to a fourth preferred embodiment of the invention.

A VSC-converter according to a fourth preferred embodiment of the invention is illustrated in FIG. 5 and it differs from the one according to FIG. 2 by the fact that both pole conductors 19, 20 are on high voltage potential, more exactly with the same amount but opposite signs, i.e. + and −, respectively, for so called bipolar operation. An earth connection 46 takes place here on the direct voltage side in a midpoint between two capacitors 47, 48 connected in series between the plus pole 19 and the minus pole 20. The advantage of this arrangement is that when a bipolar transmission is desired, fewer valve functions, fewer capacitors and fewer transformer windings are obtained in this way. The reason for the desire to use two outer capacitors 47, 48 is that the most stable pole voltages with respect to earth are obtained in this way, thanks to the fact that the voltage across the capacitors 27–28" is stable, which in the most simple way may be understood by the fact that the total three phase power transmitted between the alternating voltage and direct voltage side is constant, which leads to a small ripple of the total voltage across 27–28".

Figure 6:
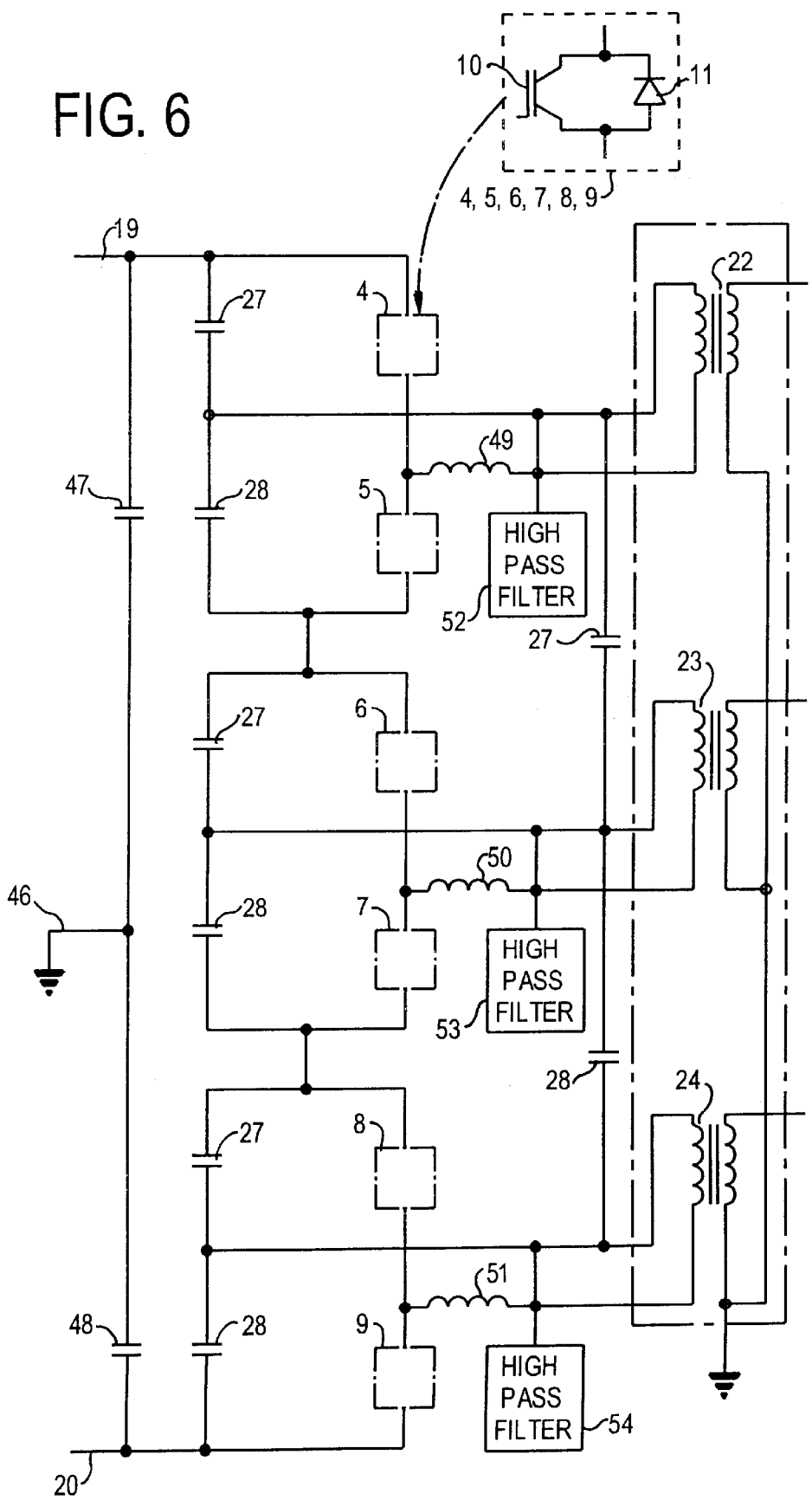
FIG. 6 is a view corresponding to FIG. 2 of a VSC-converter according to a fifth preferred embodiment of the invention.

A VSC-converter according to a fifth preferred embodiment of the invention is illustrated in FIG. 6 and it differs from the one according to FIG. 5 by the fact that inductors 49–51 and high pass filters 52–54 are arranged between the current valves 4–9 and the windings connected to the valves of the transformers 22–24. The network quality of the converter may hereby be increased, i.e. harmonics out towards connecting networks may be reduced, and stresses on the transformers connected may be reduced. Inductors and high pass filters filter away high frequency voltage harmonics on one hand between the two transformer terminals on one and the same winding, and on the other between the transformer terminals and earth, which leads to reduced stresses on the transformers. This means that the transformer windings will in the practice see a sinusoidal voltage between the terminals with a superposed direct voltage with respect to earth, which gives a robust solution and a less costly transformer.

Figure 7:
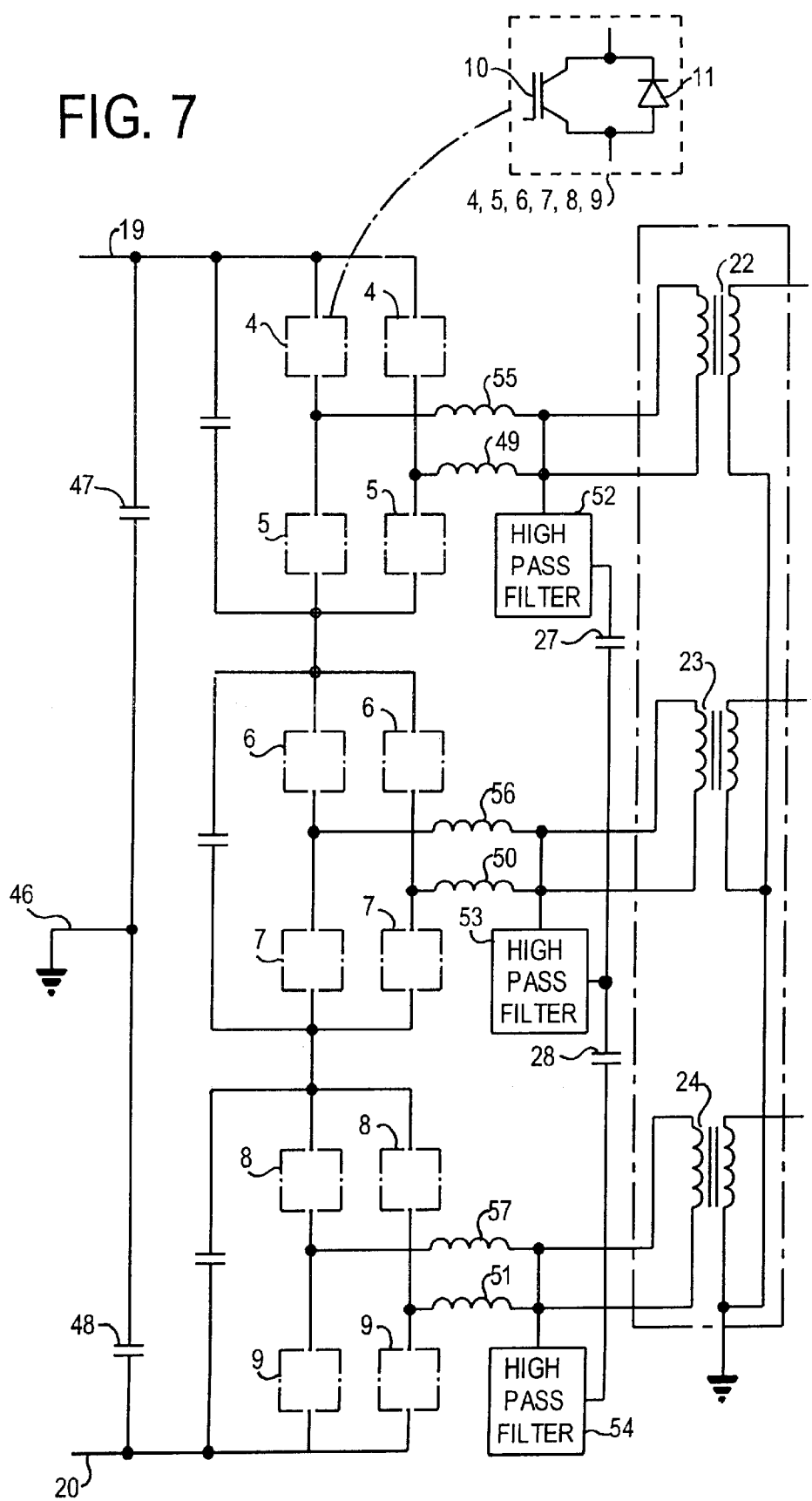
FIG. 7 is a view corresponding to FIG. 2 of a VSC-converter according to a sixth preferred embodiment of the invention.

A VSC-converter according to a sixth preferred embodiment of the invention is shown in FIG. 7 and it is a hybrid between the embodiment according to FIG. 6 and the one according to FIG. 4, i.e. the difference with respect to the embodiment according to FIG. 6 consists in forming each phase leg by a parallel connection in H-bridge. This also means that the number of inductors is doubled with respect to the embodiment according to FIG. 6, since an inductor 49–51, 55–57 is connected to the midpoint of each sub-phase leg of the H-bridge.

Figure 8:
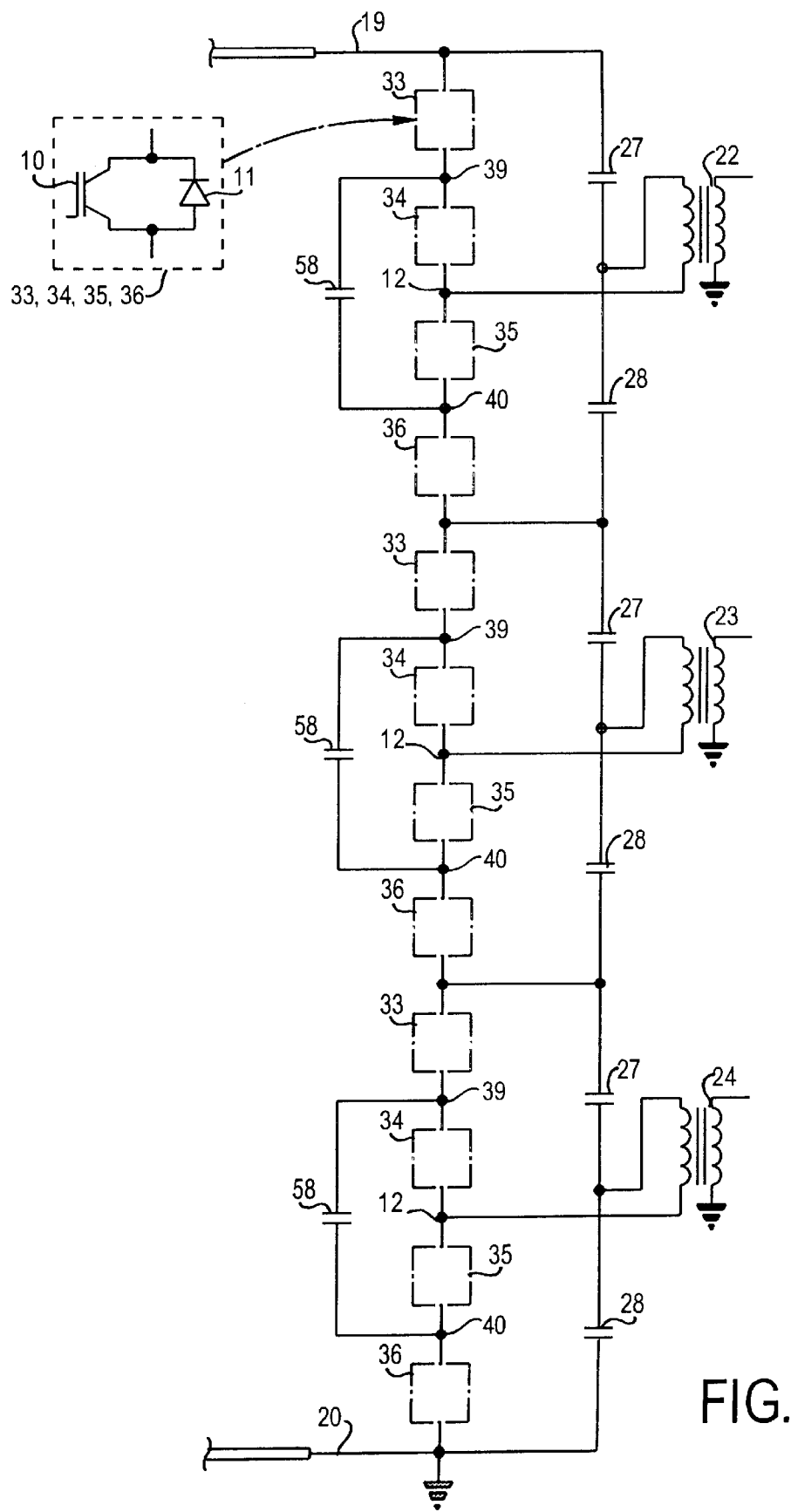
FIG. 8 is a view corresponding to FIG. 2 of a VSC-converter according to a seventh preferred embodiment of the invention, which is a variant to the converter according to FIG. 3.

A VSC-converter according to a seventh preferred embodiment of the invention is schematically illustrated in FIG. 8 and it constitutes a variant to the converter shown in FIG. 3, and this differs from the one according to FIG. 3 by the fact that here a so called flying capacitor 58 is connected between the two points 39 and 40 instead of two clamping diodes. This means that en intermediate level may be obtained on the phase output 12 by making either the valve 33 and the valve 35 conducting or making the valve 36 and the valve 34 conducting, so that three different voltage levels may be provided on the phase output 12. Thus, the same thing as for the embodiment according to FIG. 3 is here obtained, but without using any additional semiconductor elements so as to obtain this further voltage level. Another advantage of utilizing a flying capacitor instead of clamping diodes is that the switching losses may be distributed more uniformly between the four current valves 33–36 then when using clamping diodes, so that the semiconductor elements being a part of the current valves may be dimensioned smaller.

Figure 9:
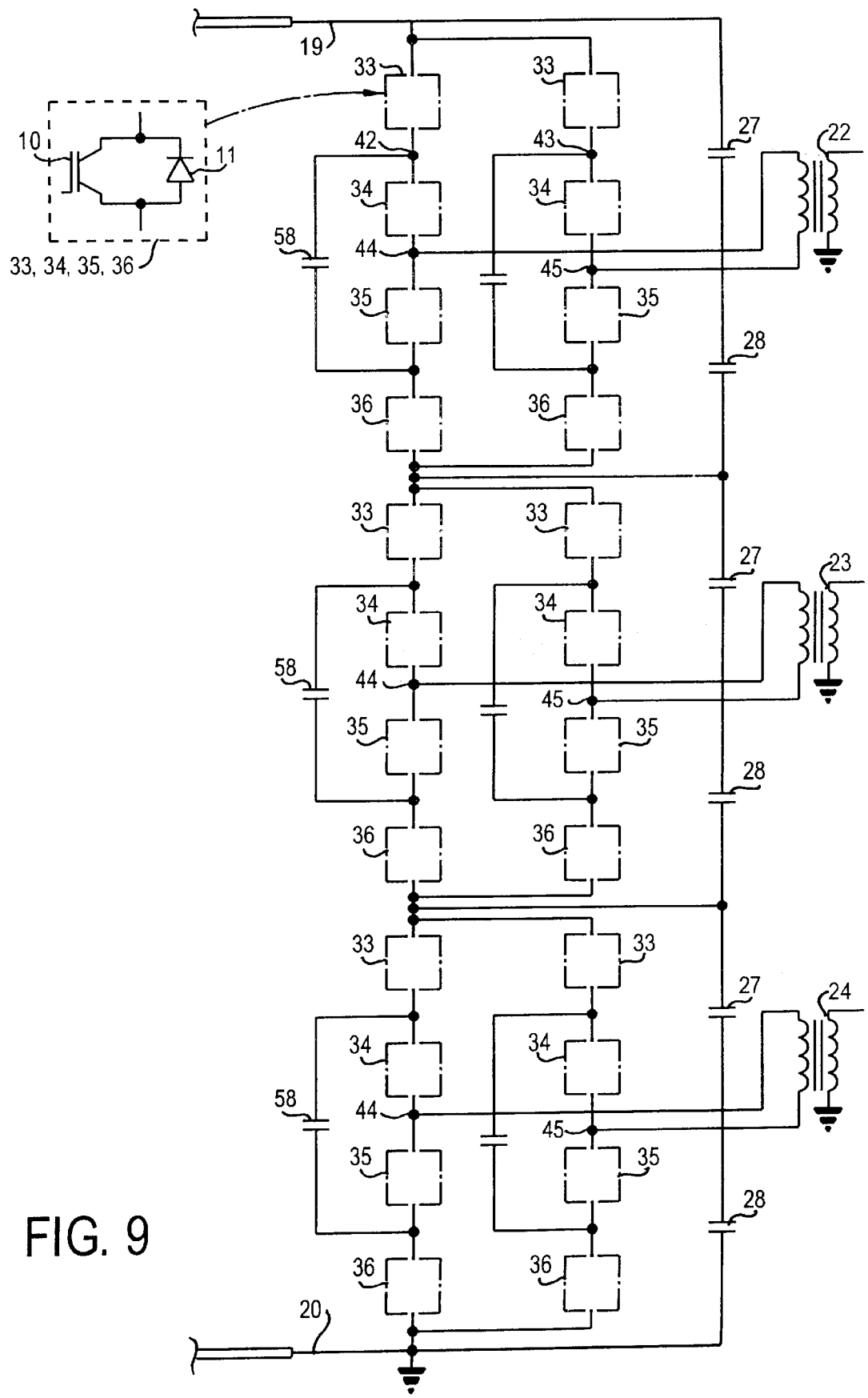
FIG. 9 is a view corresponding to FIG. 2 of a VSC-converter according to an eighth preferred embodiment of the invention, which is a variant to the converter according to FIG. 4.

FIG. 9 illustrates a VSC-converter according to an eighth preferred embodiment of the invention, which corresponds to the one according to FIG. 4, but each branch of the H-bridge is here formed by a phase leg of the type illustrated in FIG. 8, i.e. having four current valves 33–36 connected in series and a flying capacitor 58 for defining three different levels on the phase outputs 44, 45. The advantages with respect to reduced switching losses and uniform distribution thereof are the same as for the embodiment according to FIG. 8.

Figure 10:
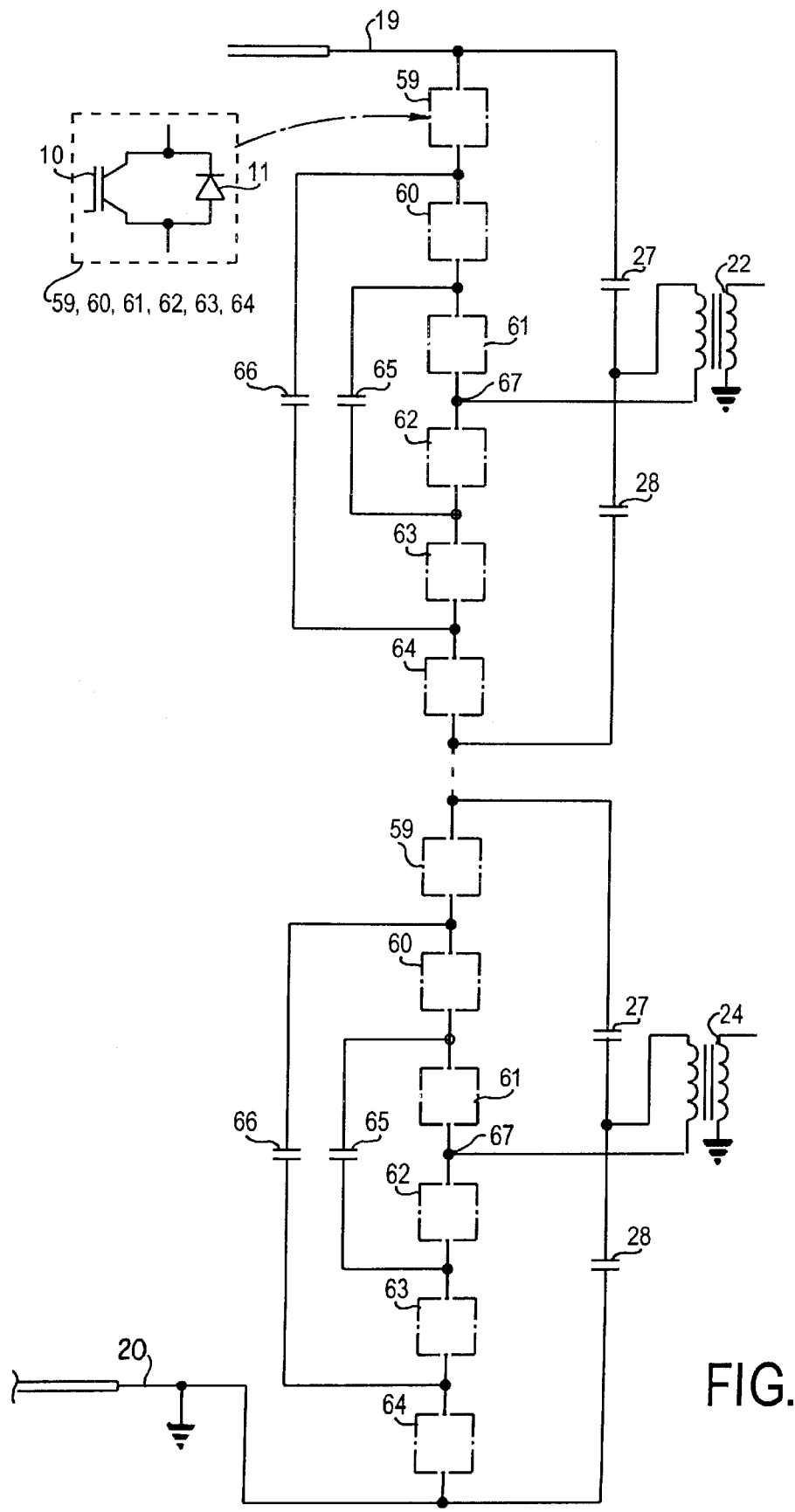
FIG. 10 is a view corresponding to FIG. 2 of a VSC-converter according to a ninth preferred embodiment of the invention, which is a variant to the converter according to FIG. 8.

A variant to the converter according to FIG. 8 is illustrated in FIG. 10 and it differs therefrom by the fact that each phase leg is formed by six current valves 59–64 connected in series, and two flying capacitors 65, 66 are here arranged so that four different voltage levels may be obtained on the phase output 67. The flying capacitors are connected between points located in corresponding positions with respect to the phase output 67 on opposite sides thereof. By increasing the number of possible voltage levels of the phase output 67 in this way, the switching losses may be further reduced. It is of course possible to further increase the number of levels by arranging even more capacitors and current valves connected in series for each phase leg, in which the number of voltage levels is the number of flying capacitors plus two.

Thus, through the VSC-converters according to the invention it gets possible to manage with fewer power semiconductor elements for a given voltage on the direct voltage side, so that the cost therefore per volt is considerably reduced.

The invention is of course not in any way restricted to the preferred embodiments described above, but many possibilities to modifications thereof will be apparent to a man with ordinary skill in the art without departing from the basic idea of the invention such as defined in the appended claims.

It would for example be well possible to design the converters according to the invention for bipolar operation if desired.

Other semiconductor elements of turn-off type may be used instead of IGBT's, for example GTO's (Gate Turn-Off thyristor) as shown in FIG. 5.

What is claimed is:

1. A VSC-converter for converting direct voltage into alternating voltage and conversely and which has at least two phase legs having each at least two current valves connected in series, said valves comprising at least a semiconductor element of turn-off type and a rectifying member connected in anti-parallel therewith, a mid point of the phase leg between said valves being adapted to form a phase output and to be connected to a phase of an alternating voltage network, wherein the phase legs of the converter are connected in series and the opposite ends of the series connection are for connection across a direct voltage network.

2. A converter according to claim 1, wherein a transformer is connected to each phase output between this and the alternating voltage network phase belonging thereto.

3. A converter according to claim 2, wherein one winding of the respective transformers is connected through a first end to the phase output of the phase leg and through a second end to a mid point between two capacitors connected in series in parallel with the current valves of the phase leg.

4. A converter according to claim 2, wherein one winding of the respective transformer is connected through a first end to the phase output of the phase leg and through a second end to a mid point between the two capacitors connected in series in parallel with the current valves of the phase leg.

5. A converter according to claim 2, wherein for each phase leg a winding of the transformer is connected between a first end connected to a mid point between the two current valves of one series connection of the current valves and connected to the mid point between the two current valves of the other series connection of current valves.

6. A converter according to claim 2, wherein at least one inductor and a high pass filter are arranged between the respective current valve and the windings of the transformer for reducing harmonics out towards the alternating voltage network and reducing stresses on the transformer.

7. A converter according to claim 1, wherein each phase leg comprises four current valves connected in series, a point of the phase leg between the two inner valves of said series connection forming said phase output, and said rectifying members are arranged to take a voltage so as to participate in defining a voltage level of the phase output located between the voltage level of the two ends of the phase leg are connected between a point between one outer valve of the series connection and the inner valve next thereto and a point between the other outer valve of the series connection and the inner valve next thereto.

8. A converter according to claim 7, wherein said rectifying members are formed by a flying capacitor connected between said points.

9. A converter according to claim 8, wherein each phase leg comprises 2n current valves, n being an integer$\geq 3$, and further comprising (n−1) couples of mid points located in corresponding positions with respect to the phase output on opposite sides thereof and connected to each other through a flying capacitor.

10. A converter according to claim 7, wherein said rectifying members are formed by a series connection of two clamping rectifiers directed in the same direction with respect to said series connection as said rectifying members, and that a mid point between the two clamping rectifiers is connected to a zero potential defined by capacitors connected in series and connected in parallel with the phase leg.

11. A converter according to claim 10, wherein the clamping rectifiers each comprise a rectifying diode and a semiconductor element of turn-off type connected in anti-parallel therewith.

12. A converter according to claim 1, wherein each phase leg has two current valves connected in series.

13. A converter according to claim 1, one of said pole conductors is intended to be on high voltage potential, while the other pole conductor is adapted to be on a potential close to earth for monopolar operation of the direct voltage network.

14. A converter according to claim 1, wherein both pole conductors are intended to be on high voltage potential of the same amount but of opposite signs for bipolar operation.

15. A converter according to claim 1, wherein each phase leg is formed by two series connections of two current valves each, said series connections being connected in parallel.

16. A converter according to claim 1, wherein the alternating voltage network has three phases and the number of phase legs connected in series is three.

17. A converter according to claim 1, connected to a direct voltage network for transmitting high voltage direct current (HVDC).

18. A converter according to claim 1, designed to deliver a high voltage within the interval 10–400 kV on the direct voltage network.

19. A converter according to claim 1, wherein said semiconductor elements of turn-off type comprise bipolar transistors having an insulated gate.

20. A converter according to claim 1, the semiconductor elements of turn-off type comprise thyristors of turn-off type.

21. A converter according to claim 1, each current valve comprises a plurality of semiconductor elements of turn-off type connected in series and a plurality of rectifying members connected in series.

22. A converter according to claim 1, designed to deliver a high voltage within the interval 50–400 kV on the direct voltage network.

* * * * *